(12) United States Patent
Flemming

(10) Patent No.: US 7,802,797 B2
(45) Date of Patent: Sep. 28, 2010

(54) FLAT SEAL

(75) Inventor: Ralf Flemming, Langenbach (DE)

(73) Assignee: Fereral-Mogul Sealing Systems GmbH, Herdorf (DE)

( * ) Notice: Subject to any disclaimer, the term of this patent is extended or adjusted under 35 U.S.C. 154(b) by 23 days.

(21) Appl. No.: 11/571,444

(22) PCT Filed: May 24, 2005

(86) PCT No.: PCT/DE2005/000940

§ 371 (c)(1),
(2), (4) Date: Dec. 29, 2006

(87) PCT Pub. No.: WO2006/002605

PCT Pub. Date: Jan. 12, 2006

(65) Prior Publication Data

US 2008/0093807 A1   Apr. 24, 2008

(30) Foreign Application Priority Data

Jun. 30, 2004  (DE) .................... 10 2004 031 491

(51) Int. Cl.
*F02F 11/00* (2006.01)
(52) U.S. Cl. ..................... 277/593; 277/595
(58) Field of Classification Search ........ 277/593–595
See application file for complete search history.

(56) References Cited

U.S. PATENT DOCUMENTS

| | | | | |
|---|---|---|---|---|
| 4,203,608 A * | 5/1980 | Nicholson | .................... | 277/595 |
| 4,765,634 A * | 8/1988 | Kobayashi et al. | .......... | 277/595 |
| 4,815,750 A * | 3/1989 | Yoshino | ........................ | 277/595 |
| 4,998,741 A | 3/1991 | Udagawa et al. | | |
| 5,385,354 A * | 1/1995 | Hagiwara et al. | ........... | 277/594 |
| 5,536,024 A * | 7/1996 | Udagawa | ........................ | 277/595 |
| 5,873,577 A * | 2/1999 | Inamura | ........................ | 277/594 |
| 5,988,651 A * | 11/1999 | Miyaoh | ........................ | 277/593 |
| 6,036,195 A * | 3/2000 | Udagawa | ........................ | 277/595 |
| 6,076,833 A | 6/2000 | Geshi et al. | | |
| 6,139,025 A * | 10/2000 | Miyaoh | ........................ | 277/593 |
| 6,250,645 B1 * | 6/2001 | Udagawa | ........................ | 277/595 |
| 6,431,554 B1 * | 8/2002 | Miyamoto et al. | .......... | 277/593 |
| 6,769,696 B2 * | 8/2004 | Diez et al. | .................. | 277/593 |
| 6,926,282 B2 * | 8/2005 | Werz et al. | .................. | 277/591 |
| 7,137,631 B2 * | 11/2006 | Udagawa et al. | ............ | 277/594 |
| 7,204,491 B2 * | 4/2007 | Hatamura et al. | .......... | 277/593 |
| 7,367,566 B2 * | 5/2008 | Udagawa et al. | ............ | 277/593 |

(Continued)

FOREIGN PATENT DOCUMENTS

EP    0834687    4/1998

(Continued)

*Primary Examiner*—Alison K Pickard
(74) *Attorney, Agent, or Firm*—Robert L. Stearns; Dickinson Wright, PLLC

(57) ABSTRACT

A flat seal, assembly comprises at least one metallic layer, which is to be supplied with several passages, spaced by bridges, whereby at least one corrugation and/or at least one wavelike contouring is to be set out at least in the area of one of the layers, on the passage side and at least for part of the area. The profile surrounding the pertaining passage has an approximately constant cross-section and a different profile is provided for the area of the pertaining bridge at a specified circumferential angle (α) to increase compression in this area.

6 Claims, 1 Drawing Sheet

U.S. PATENT DOCUMENTS

Figure 1:
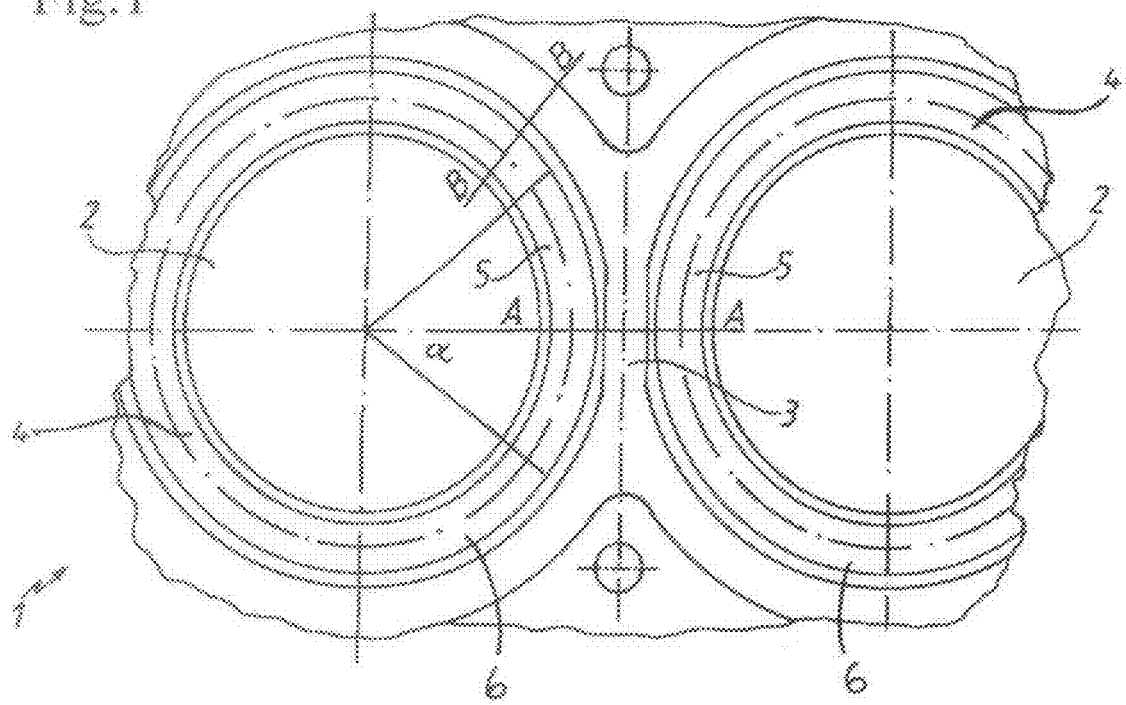

| | | | |
|---|---|---|---|
| 7,490,835 B2 * | 2/2009 | Diez et al. | 277/593 |
| 7,527,269 B2 * | 5/2009 | Tiefenbach et al. | 277/593 |
| 2003/0197334 A1 * | 10/2003 | Werz et al. | 277/593 |
| 2004/0041352 A1 | 3/2004 | Hohe et al. | |
| 2004/0160017 A1 * | 8/2004 | Diez et al. | 277/593 |
| 2006/0061045 A1 * | 3/2006 | Burg | 277/593 |
| 2006/0066059 A1 * | 3/2006 | Fritz | 277/593 |
| 2006/0175763 A1 * | 8/2006 | Duckek et al. | 277/593 |

FOREIGN PATENT DOCUMENTS

| | | |
|---|---|---|
| JP | 61255253 | 11/1986 |

* cited by examiner

FLAT SEAL

BACKGROUND OF THE INVENTION

1. Technical Field

The invention concerns a flat seal, comprising at least one metallic layer, which is to be supplied with several passages, spaced by bridges, whereby at least one corrugation and/or at least one wavelike profile is to be set out at least in the area of one of the layers, on the passage side and at least for part of the area.

2. Related Art

A metal plate with a reinforcing bulge and a cylinder head gasket showing the same bulge are apparent from DE-A 3943177. The metal plate is furnished with at least one separating area between two adjacent cylinder holes and at least one reinforcing bulge is set out in that separating area, so as to span the length of said separating area. The reinforcing bulge works in such a manner, that it reinforces, stiffens, strengthens, etc., the separating area and forms a seal with or rather in said area. The metal plate may be assembled with other plates to form a steel laminate or rather—plate seal. The indicated measures provide for a relatively complicated set-up in the bridge areas, incurring considerable expenses.

A flat seal and its manufacturing procedure is described in WO 01/96768. The flat seal is to be furnished with at least one passage, whereby this passage or at least one of the metallic layers is developed in the form of a wave and/or tooth-shaped contouring surrounding the passage(s) at least in part. The contouring is designed essentially in the same manner, as seen across the scope of the passage, allowing for areas to be designed in the assembly of the flat seal, which do not allow for ideal compression.

SUMMARY OF THE INVENTION

The invention is based on the task of developing a generic flat seal, to that effect that compression may be adjusted variably, especially for critical areas of the flat seal. This task is solved in that a roughly uniform cross-section of the profile surrounds the pertaining passage and that a different profile is provided in the area of the pertaining web with a specified circumferential angle to increase compression in this area.

The flat seal is conveniently designed as a cylinder head gasket for a combustion engine.

A modified profile is formed thus, as opposed to the state of the art, which can adjust the compression in this areas specifically via a specifiable circumferential angle (10-120°).

The shape of the previously surrounding waves is modified into a steplike profile to create a relatively rigid stopper in the bridge area. Compression can be variably adjusted in the desired manner by varying the circumferential angle of the steplike profile, so that with the use as a cylinder head gasket even the most diverse motor construction forms can be accounted for.

THE DRAWINGS

Figure 2:
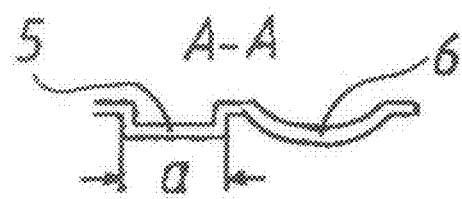
Figure 3:
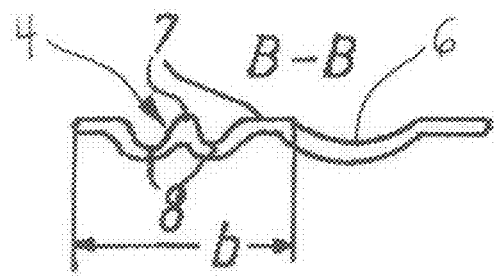

The object of invention is illustrated with an embodiment example in the drawing and is described as follows. Illustrated are:

FIG. 1 Top view of a detail of a flat seal serving as a cylinder head gasket seat;

FIG. 2 Section according to line A-A of FIG. 1;

FIG. 3 Section according to line B-B of FIG. 1;

DETAILED DESCRIPTION

FIG. 1 illustrates a flat seal 1, usable as a cylinder head gasket, which shows several passages 2, which are spaced by the bridges 3. Surrounding the pertaining passage 2 in this example is a wavelike profile 4. To influence the compression in the area of bridge 3 the surrounding profile 4 in the area of the bridge 3 transitions in to a steplike profile 5, whereby profiles 4, 5 merge seamlessly. The steplike profile 5 is in this example intended for a circumferential angle $\alpha$ of 100°. Other angles can be provided for depending on the embodiment of the flat seal 1, such as between 10-120°.

FIG. 2 illustrates a cross-section as line A-A of FIG. 1. Displayed is a part of the middle bridge 3 within bridge angle $\alpha$. A single steplike shaped profile 5 is visible, whose cross-section is somewhat U shaped and has a specifiable width a. This steplike profile 5 merges radially into a wave crest as viewed in the direction of the adjacent passage. If required, a similar profile may be connected in mirror image fashion as seen in the direction of the parallel passage 2. Naturally, alternative construction forms are also conceivable here by simply molding an attached additional step profile 5.

FIG. 3 illustrates a cross-section as per line B-B of FIG. 1. The section is provided outside of bridge 3. The wavelike crest 4 surrounding the remaining circumferential area (260°) is recognizable with a specifiable width b and likewise specifiable number of wave troughs 8 and wave crests 7. The widths a, b and the height of the profiles 4, 5 as well as width and height of the wave area 6 may be designed differently upon requirement, so as to effect ideal compression of the cylinder head gasket 1.

The invention claimed is:

1. A flat seal assembly comprising:
   at least one metallic layer having at least a pair of adjacent passages separated by a bridge section of said at least one metallic layer extending over a predetermined circumferential bridge angle of said passages;
   a first crest spaced from and surrounding each of said passages and having a uniform profile about its circumference including within said bridge angle and outside of said bridge angle; and
   a second crest surrounding each of said passages radially inward of said first crest and having a first profile inside of said bridge angle and which transitions to a second profile outside of said bridge angle which is different than said first profile, wherein said first profile comprises a stepped profile, and said second profile comprises a wave profile.

2. The flat seal of claim 1 wherein said wave profile includes at least one trough and at least two crests, or at least two troughs and at least one crest.

3. The flat seal of claim 1 wherein said first profile has a greater compression strength than that of said second profile.

4. The flat seal of claim 1 wherein said bridge angle is between 10 and 120 degrees.

5. The flat seal of claim 1 wherein said first crest of said adjacent passages are spaced from one another across said bridge.

6. The flat seal of claim 1 wherein said flat seal comprises a cylinder head gasket.

* * * * *